United States Patent
Prabhu et al.

(10) Patent No.: US 12,126,498 B2
(45) Date of Patent: Oct. 22, 2024

(54) INTELLIGENT TIME TO FAIL PREDICTION FOR OPTICAL TRANSCEIVERS

(71) Applicant: HEWLETT PACKARD ENTERPRISE DEVELOPMENT LP, Houston, TX (US)

(72) Inventors: Venugopal Vembrakat Ranganath Prabhu, Bangalore (IN); David McMullen, Nashua, NH (US); Chuan Peng, Houston, TX (US); Kevin R. Dick, Houston, TX (US); Chandan Kenchegowda, Bangalore (IN); Nagaraj Davanakatti, Bangalore (IN); Pavithra Halappa Jakallannavar, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 28 days.

(21) Appl. No.: 17/831,257

(22) Filed: Jun. 2, 2022

(65) Prior Publication Data
US 2023/0396510 A1 Dec. 7, 2023

(51) Int. Cl.
H04L 41/149 (2022.01)
H04B 10/077 (2013.01)
H04L 41/147 (2022.01)

(52) U.S. Cl.
CPC ....... *H04L 41/149* (2022.05); *H04B 10/0773* (2013.01); *H04B 10/0775* (2013.01); *H04L 41/147* (2013.01)

(58) Field of Classification Search
CPC . H04L 41/147; H04L 41/149; H04B 10/0773; H04B 10/0775
USPC .................................................. 398/9
See application file for complete search history.

(56) References Cited

U.S. PATENT DOCUMENTS

| | | | |
|---|---|---|---|
| 6,697,874 B1 | 2/2004 | Friden et al. | |
| 8,442,398 B2 | 5/2013 | Li et al. | |
| 8,687,682 B2 | 4/2014 | Mobin et al. | |
| 8,848,769 B2 | 9/2014 | Mobin et al. | |
| 9,294,194 B2 | 3/2016 | Vuppuladhadium et al. | |
| 9,444,713 B1 | 9/2016 | Dropps et al. | |
| 9,461,768 B2 | 10/2016 | Kipp | |
| 9,521,095 B2 | 12/2016 | Kono et al. | |
| 9,813,192 B2 | 11/2017 | Loprieno et al. | |
| 10,177,842 B2* | 1/2019 | Kim .................. | H04B 10/0775 |

(Continued)

*Primary Examiner* — Mohammad R Sedighian
(74) *Attorney, Agent, or Firm* — Sheppard Mullin Richter & Hampton LLP

(57) ABSTRACT

Systems are methods are provided for implementing an intelligent optical transceiver. The intelligent optical transceiver implements dynamic health monitoring and "time to fail" prediction functions to predict a failure of a component before it malfunctions during use. By employing the intelligent optical transceiver, a network can prevent failures in its optical connectivity that can degrade the network performance, such as experiencing outages and data unavailability. For example, the intelligent optical transceiver includes a module health monitor, which monitors, in real-time, health parameters of optical communication components in the intelligent optical transceiver. Also, the intelligent optical transceiver includes a time to fail predictor which predicts a time to fail for the optical communication components of the optical transceiver based on a result of a defined regression function.

13 Claims, 7 Drawing Sheets

(56) References Cited

U.S. PATENT DOCUMENTS 10,810,063 B2 10/2020 Mukherjee
11,038,588 B1* 6/2021 Lee ........................ H04B 10/40
2021/0350942 A1* 11/2021 Mandal ................. H04L 67/303

* cited by examiner

INTELLIGENT TIME TO FAIL PREDICTION FOR OPTICAL TRANSCEIVERS

BACKGROUND

Optical communication technology is used in some computing networks to increase speed, cable length and overall bandwidth for communication between different networking devices (e.g., server device to a network router, among network switches). Storage networking is one such networking application, which employs optical communication technology (e.g., optical fiber cables, optical transceiver modules) within the industry.

Particularly, storage area networks (SANs) can employ optical fiber connections to achieve long range network communication. For example, when optical communication technologies and optical interfaces are employed, a SAN is capable of offering data rates up to 128 Gbps across metropolitan area distances (e.g., up to about 6 miles or 10 km). Furthermore, various optical components, including optical transceivers, are increasingly being integrated into networking devices. For instance, switches that are employed in storage networking may be equipped with optical transceivers in order to leverage the enhanced capabilities of optical communication technology to the tackle the unique demands of storage networking, such as data growth, demanding workloads and high-performance.

BRIEF DESCRIPTION OF THE DRAWINGS

The present disclosure, in accordance with one or more various implementations, is described in detail with reference to the following figures. The drawings are provided for purposes of illustration only and merely depict typical or example implementations. These drawings are provided to facilitate the reader's understanding of various implementations and shall not be considered limiting of the breadth, scope, or applicability of the present disclosure. It should be noted that for clarity and ease of illustration these drawings are not necessarily made to scale.

Figure 1:
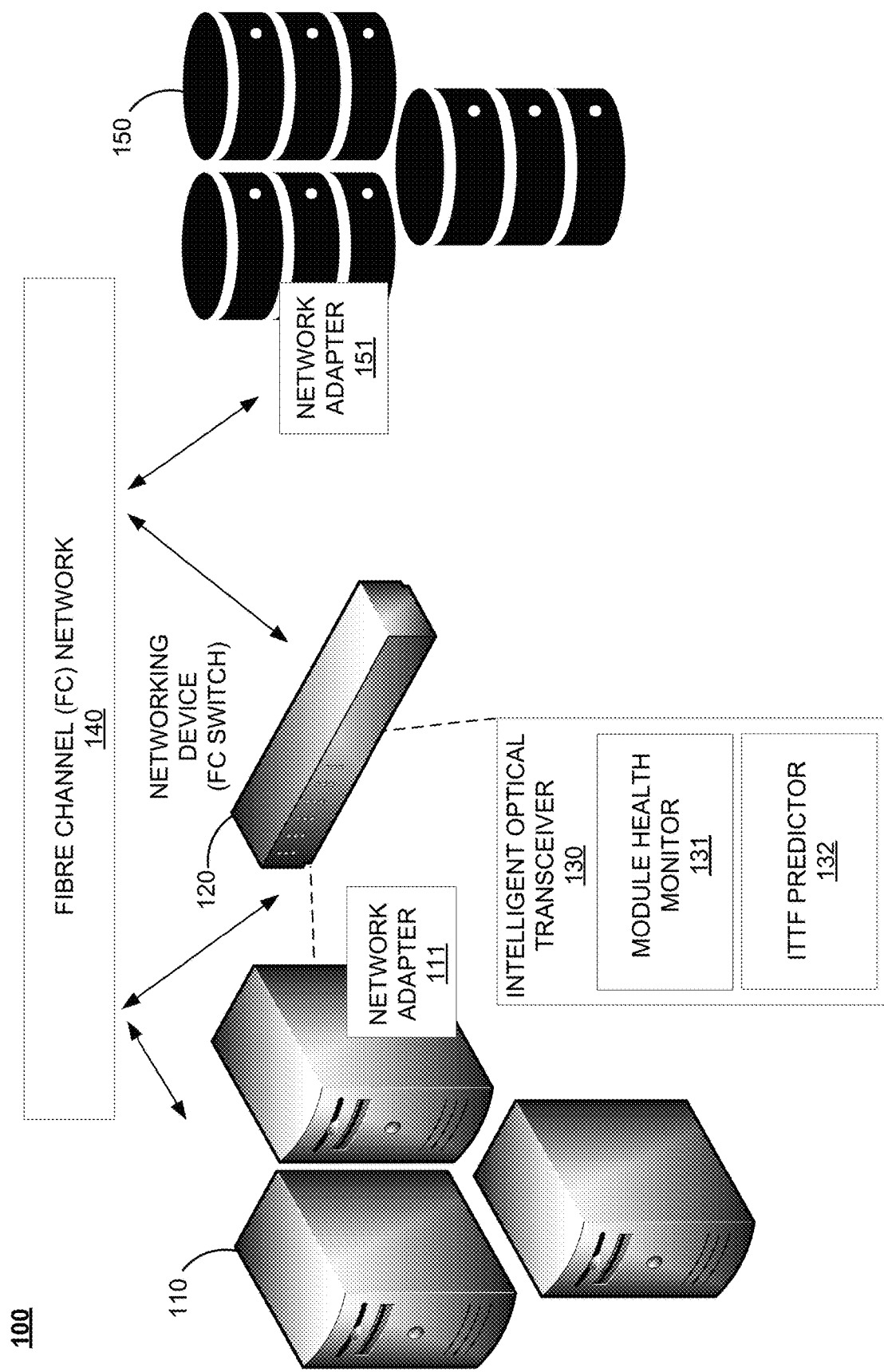
FIG. 1 illustrates an example storage networking environment that includes a disclosed intelligent optical transceiver implementing a "time to fail" prediction, in accordance with the disclosure.

The figures are not intended to be exhaustive or to limit various implementations to the precise form disclosed. It should be understood that various implementations can be practiced with modification and alteration.

DETAILED DESCRIPTION

A storage area network (SAN) is a dedicated high-speed network or subnetwork that interconnects and presents shared pools of storage devices to multiple servers. The availability and accessibility of storage are critical concerns for enterprise computing. Traditional direct-attached disk deployments within individual servers can be a simple and inexpensive option for many enterprise applications, but the disks, and the vital data those disks contain, are tied to the physical server across a dedicated interface, such as SAS. Modern enterprise computing often demands a much higher level of organization, flexibility, and control. These needs drove the evolution of the storage area network (SAN).

A SAN can support a large number of storage devices, providing an increased amount of storage volume and greater storage accessibility in the infrastructure. Also, storage arrays (e.g., special designed storage subsystems) that support a SAN can scale to hold hundreds, or even thousands, of disks. Similarly, servers with a suitable SAN interface can access the SAN and its vast storage potential, and a SAN can support many servers. Further, a SAN can improve storage availability. Because a SAN is essentially a network fabric of interconnected computers and storage devices, a disruption in one network path can usually be overcome by enabling an alternative path through the SAN fabric. Thus, a single cable or device failure does not leave storage inaccessible to enterprise workloads. Also, the ability to treat storage as a collective resource can improve storage utilization by eliminating "forgotten" disks on underutilized servers. Instead, a SAN offers a central location for all storage, and enables administrators to pool and manage the storage devices together.

SANs can utilize Fiber Channel (FC) to implement the network's infrastructure, supporting connections and interfaces within the storage network. For example, a SAN can particularly employ the FC networking technology to connect multiple storage arrays, and server hosts, through FC switches to establish a regional network dedicated to data storage in the SAN. FC is a high-speed networking technology that can be used for transmitting data among data centers, computer servers, switches, and storage at data rates of up to 128 Gbps. FC was developed to overcome the limitations of previous large-scale networking technologies, such as Small Computer System Interface (SCSI) and High-Performance Parallel Interface (HIPPI), by filling the need for a reliable and scalable high-throughput and low-latency protocol and interface. Consequently, FC is especially suited for connecting servers to shared storage devices and interconnecting storage controllers and drives, which is applicable within SAN architectures.

To further improve efficiency and throughput in networking, optics are increasingly being integrated within networking devices, such as routers, switches, and controllers. Particularly, networking devices that are employed within the SAN architecture, such as FC switches, can be integrated with optical components to further leverage the capabilities of optical networking technology. For example, an FC switch equipped with multiple optical transceivers enables optical communications between the servers and the storage device, in a manner that achieves high bandwidth and low-latency in the SAN. As background, an optical transmitter may electronically modulate a carrier light provided by a laser to convey information over an optical channel, converting electrical signals to optical signals on a transmit channel. An optical transmitter is normally accompanied by an optical receiver across an optical fiber. An optical receiver converts detected light signals to electrical signals. An optical transmitter and optical receiver together form an optical transceiver. Accordingly, as used herein, the term optical transceiver refers to a device (or module) that uses fiber optical technology to send and receive data, and thereby conveys information over an optical channel (e.g., transmit and receive optical signals).

The amounts of data traffic that may be experienced by a storage network, for example data centers in a medium to large-scale enterprise infrastructures, can drive the required operating rates of the optical transceivers that are utilized throughout the SAN. In other words, the optics of a FC switch, for example, should support high-speed links that are capable of moving the data through the SAN to keep up with an ever-increasing demands of data access and also maximize the performance (and reduce latency) of the storage resources. In the industry, the 10 G rate port in optical transceivers has been iterated to the 40 G rate, and the 40 G rate port has been upgraded to the 100 G rate port. With the cost reduction and maturity of single-channel 25 G optical modules, 25 G rate ports are also quite cost-effective options. As technology advances, data centers in the future will need to undergo internal massive calculations with the rise of computation intensive system, such as artificial intelligence (AI), virtual reality (VR), and other applications. As a result, there may be a rapid increase of data transmission within SAN as these technological applications expand, and the 25 G, 32 G, 64 G, and even 100 G, optical transceiver market for these storage networking environments will continue to grow at a high speed. For example, an FC switch having 64 G optical transceivers can support high-speed optical communications (over multi-mode optical fiber) at a rate that is suitable for the data growth, demanding workloads, and high performance that may be expected for a large-scale storage network infrastructure.

Thus, with the optical transceiver being such a key component in the overall efficiency and performance of a SAN as previously described, it may be beneficial to mitigate, or at least predict, a failure of an optical transceiver in the storage network infrastructure. Accordingly, the disclosed embodiments provide an intelligent optical transceiver that is equipped with dynamic health monitoring and "time to fail" prediction capabilities to prevent in-use failures that may disrupt network connectivity and degrade network (e.g., SAN) performance.

The example network configuration 100 is illustrated as a dedicated network that can be used for storage connectivity between multiple host servers 110 and shared storage, shown as storage devices 150, that deliver block-level data storage. Accordingly, the example network configuration 100 can be a storage area network (SAN), or other known types of networks that can support interconnections to present shared pools of storage devices to hosts. Accordingly, the example network configuration 100 is shown to include a communication network 140 that supports high-speed data transfer technology, such as Fiber Channel (FC), that may be optimized for storage connectivity (e.g., access and/or distribution of stored data and storage devices) within a SAN. Thus, the communication network 140 is shown as a FC network. Although the intelligent optical transceiver 130 is described with respect to the network configuration 100 illustrated in FIG. 1, it is a not intended to be limiting and the configuration and functions of the transceiver 130 disclosed herein can operate within network configurations beyond storage networks and FC technology.

As a FC network, the communication network 140 implements high-speed data transfer that provides in-order, lossless delivery of data, such as the data within storage devices 150. Also, the communication network 140 provides the switch fabric that supports high-speed connections between the networked devices, namely the host servers 110, networking device 120, and the storage devices 150. The communication network 140 can operate in accordance with a standard for FC technology, including but not limited to: 16 G Fibre Channel; 32 G Fibre Channel (also referred to as "Gen 6" FC); 64 G Fibre Channel (also referred to as "Gen 7" FC); and 128 G Fibre Channel (referred to as "Gen 8" FC). As an example, the network configuration 100 is a SAN operating within a data center, where the communication network 140 supports the remote storage, processing, and distribution of large amounts of data between the host servers 110 and the storage devices 150. Furthermore, being consistent with FC technology, the communication network 140 enables data throughput speeds of up to 64 G within the storage networking architecture. As previously described, the communication network 140 can utilize optical fiber cables to implement the physical layer (or fabric layer) connections between the host servers 110, the networking device 120, and the storage devices 150. With optical-based connectivity, the communication network 140 leverages the speed, efficiency, and bandwidth benefits of optical technology for storage networking. Other forms of physical connectors (or cabling), such as copper cabling, can also be used by the communication network 140.

For instance, a deployment of the networking configuration 100 can be inside of data center, where the SAN implements increased I/O capacity to accommodate massive amounts of data, applications, and workloads, while providing low latency, increased server virtualization, and adoption of emerging storage technologies for high-speed data processing, such as Flash-based storage, and Non-Volatile Memory Express (NVMe). Moreover, the networking configuration 100 provides an increased reliability and resiliency of storage networking operations by enhancing the functionality of the intelligent optical transceiver 130. As further described herein, the intelligent optical transceiver 130 is designed to have the distinct capability of predicting a failure of the component, before it malfunctions and its failure escalates to a larger scale (e.g., affecting the operation of the networking device and/or optical link). Consequently, by employing the intelligent optical transceiver 130, as disclosed herein, the network can prevent failures in its optical connectivity that would ultimately degrade the performance of the storage network, such as experiencing outages and data unavailability.

FIG. 1 also illustrates that the network configuration 100 includes a networking device 120, namely a switch. The networking device 120 is also configured to operate in accordance with optical-based and FC technologies. Thus, the networking device 120 is shown particularly as an FC switch, which is compatible for use with a SAN, such as the example SAN shown in FIG. 1. It should be appreciated that the networking device 120 may be implemented as any one of a number of different networking equipment and/or devices that have the capability to provide network connectivity, such as routers, bridges, gateways, hubs, repeaters, network cards, and the like. Although FIG. 1 shows a single networking device 120, this is not intended to be limiting for the network configuration 100 and one or more additional networking devices 120 can be implemented within a storage network, such as the example SAN of FIG. 1. For instance, several FC switches can be combined to create large SAN fabrics that interconnect thousands of servers and storage ports.

In operation, for instance as an FC switch, the networking device 120 routes communication and/or data, particularly between the host servers 110 and the storage devices 150 within the SAN. As illustrated in FIG. 1, the networking device 120 can act as an intermediary between the servers 110 and storage 150. In the example network configuration 100, a server 110 has a network adaptor 111 that interfaces to a physical link to the networking device 120, rather than being attached directly to the storage devices 150. Likewise, a storage device 150 has a network adaptor 151 to facilitate a physical link to connect to the networking device 120.

As an operational example, one of the servers 110 can request to access a particular storage device from the storage devices 150 to retrieve data stored thereon. The networking device 120, acting as FC switch, inspects a data packet header, in order to determine the computing device of origin, and the destination, in order to forward the packet to the intended system. Based on this packet inspection, the networking device 120 directs the request to the appropriate destination, which corresponds to one of the storage devices 150.

Furthermore, the networking device 120 can have optical components integrated therein, such as the disclosed intelligent optical transceiver 130. By including the intelligent optical transceiver 130 (and other optical components) the networking device 120 can leverage enhanced speed, bandwidth, efficiency, and other enhanced capabilities associated with optical technology. Restated, the networking device 120 may be more optimal for the operations and demands of storage networking by supporting optical communication technology. For example, the intelligent optical transceiver 130 can enable signaling speeds up to 57.8 Gb/s and support emerging standards such as 64 G Fiber Channel (also referred to as "Gen7" FC).

As a general description, the intelligent optical transceiver 130 supports the insertion and/or removal of fiber optic connectors to the networking device 120. The intelligent optical transceiver 130 also implements various functions, such as performing electrical-to-optical conversion, supporting optical connectivity using high speed serial links over multi-mode optical fiber at data rates ranging from 16 G/32 G NRZ up to 57.8 Gb/s PAM4 (the serial line rate of 64 G FC), for example, and link distances up to 10 km (and beyond). Target applications for the intelligent optical transceiver 130 can include various forms of networking, such as LAN Ethernet and SAN Fibre Channel. In an embodiment, the intelligent optical transceiver 130 is implemented as a short wave (SW) (e.g., optical wavelength approximately 850 nm) small form-factor pluggable (SFP) optical transceiver. The intelligent optical transceiver 130 can be implemented as one of the emerging generations of SFP optical transceivers, such as SFP28-SFP56, or other forms of SFP optical transceivers, such as Quad Small Form Pluggable (QSFP), Quad Small Form Pluggable Double Density (QSFP-DD), and the like. Accordingly, in the SW SFP56 FC configuration, the intelligent optical transceiver 130 is a compact and hot-pluggable device that acts as an interface between the networking device 120 and the interconnecting cabling, such as fibre optic cables. For example, the intelligent optical transceiver 130 can be physically inserted into an input port of the networking device 120. In turn, the fiber optic cable can be installed in the intelligent optical transceiver 130 thereby connecting the fiber optic cable to the networking device 120. In an embodiment, the networking device 120 is an FC switch that includes multiple ports, where multiple intelligent optical transceivers 130 can be installed to support parallel traffic streams and enable greater bandwidth than can be achieved through a single FC connection.

Figure 2:
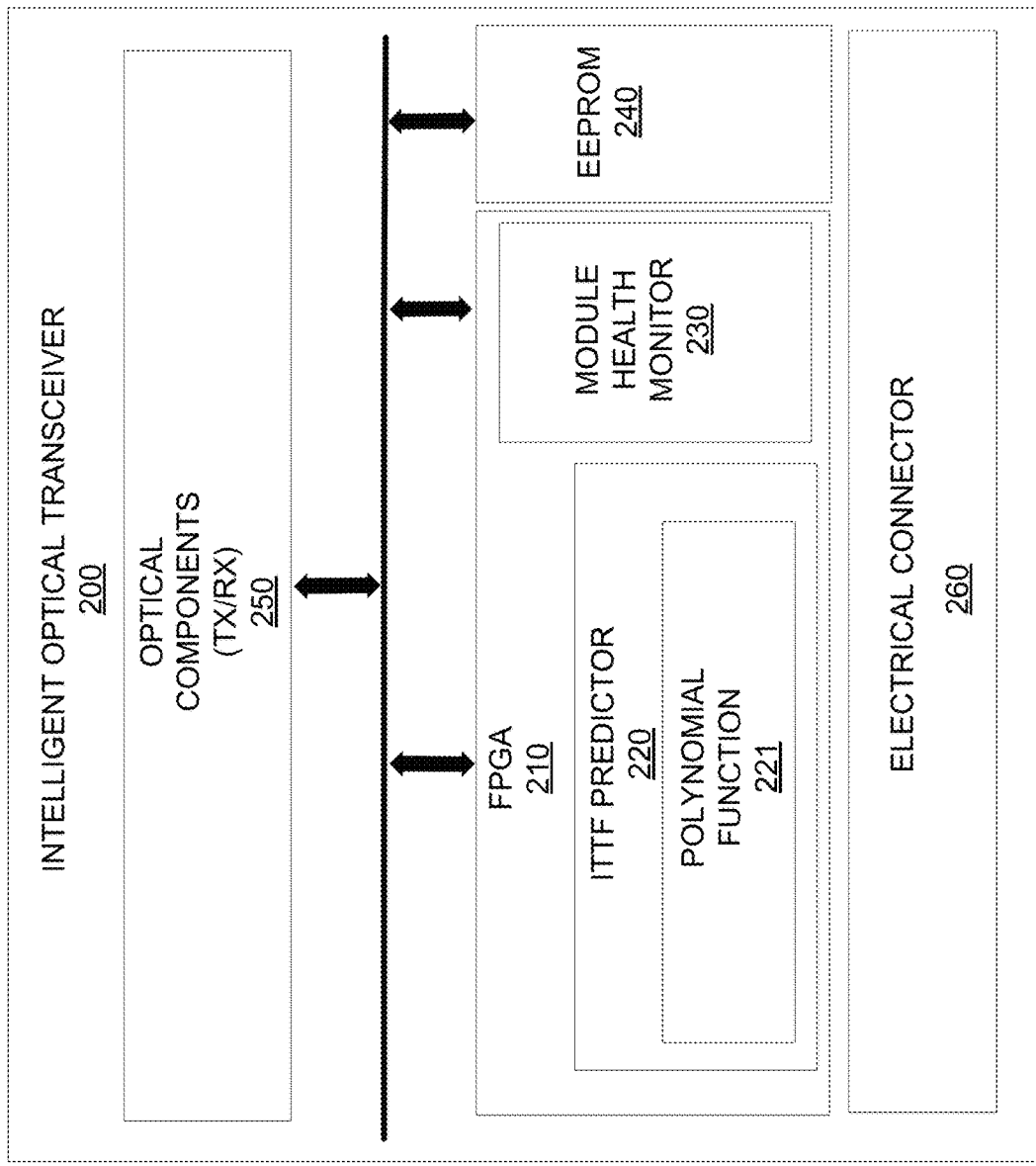
FIG. 2 illustrates an example configuration for the intelligent optical transceiver shown in FIG. 1 including a module health monitor and an intelligent time to fail predictor, in accordance with the disclosure.

As previously described, the intelligent optical transceiver 130 is particularly designed to support the enhanced capability of dynamically predicting a "time to fail" while deployed (e.g., during operation). FIG. 1 illustrates that the intelligent optical transceiver 130 includes specialized components to implement the disclosed "time to fail" prediction capabilities. In the example, the intelligent optical transceiver 130 includes: a module health monitor 131 that is configured to monitor and store data associated with transceiver health parameters, such as transmitter (TX) output power, that can be indicative of a potential operational failure of the intelligent optical transceiver 130 module (or a component thereof); and an intelligent time to fail predictor 132 that is configured to perform dedicated calculations to predict a "time to fail" for the intelligent optical transceiver 130 based on the stored data. The module health monitor 131 and the intelligent time to fail predictor 132 can be implemented in various forms, such as a central processing unit (CPU), a processor(s), a computing device, circuitry, firmware, and/or electronic controller which enables various functions and/or controls of the disclosed "time to fail" prediction capabilities. The module health monitor 131 and the intelligent time to fail predictor 132 are shown in FIG. 1 as stand-alone components, however in some embodiments, these components may be implemented as an integrated part of another device within the intelligent optical transceiver 130. FIG. 2 depicts an example configuration for the intelligent optical transceiver 130, showing an implementation for module health monitor 131 and the intelligent time to fail predictor 132 with respect to other internal components of the module in greater detail.

During operation of the intelligent optical transceiver 130, for example while the networking device 120 is supporting optical connectivity for functions of the SAN in FIG. 1, the module health monitor 131 is dynamically monitoring one of more health parameters that are associated with diagnostics of the intelligent optical transceiver's 130 proper function. For instance, the module health monitor 131 is configured to measure the current operational values of one or more internal components that are critical for the proper overall function of the intelligent optical transmitter 130, such as the optical transmitter (TX) and/or the optical receiver (RX), as health parameters. That is, if a component is not producing values as expected, such as power, bias current, temperature, supply voltage, and the like, these parameters can indicate that the health of the intelligent optical transceiver 130 is degrading in a manner that can negatively impact its proper function, and further runs the risk of propagating into issues that reduce the overall performance of the storage network. Thus, as a diagnostic tool, the module health monitor 131 captures data from these components as health parameters that may be indicative of early signs of module/device degradation, and even further can be extrapolated to predict a "time to fail" for the intelligent optical transmitter 130. In other words, the module health monitor 131 can determine if a critical component of the intelligent optical transmitter 130 is currently operating at parameters that are deemed dangerously low for it to function properly. The intelligent time to fail predictor 132, by obtaining data for the health parameters from the module health monitor 131, can execute the necessary calculations to predict a "time to fail" for the intelligent optical transmitter 130 that is in the future. The disclosed "time to fail" prediction capabilities of the intelligent optical transmitter 130 permits a window of time (e.g., days) before the device's failure for a corrective action (e.g., autonomous function, intervention of a network administration) to be performed to avoid a catastrophic failure of the network that would otherwise result from allowing the intelligent optical transceiver 130 to reach the point of failure while it is still being utilized by the networking device 120.

In an embodiment, the module health monitor 131 is configured to monitor an output power of the intelligent optical transceiver's 130 optical transmitter (TX), also referred to herein as the TX output power. For example, the module health monitor 131 can detect that the transmitter of the intelligent optical transmitter 130 is currently operating within parameters for its output power that is much lower than expected, which indicates a substantive degradation of this component. For example, an initial TX output power for the intelligent optical transceiver 130, for instance when the module is first deployed (e.g., day zero value), can be approximately 10.0 dBm. However, after a prolonged period of usage within the networking configuration 100, the stress and wear of continued use can begin to slowly deteriorate the intelligent optical transceiver's 130 optimal performance over time. As a result, the module health monitor 131 can measure that the TX output power is now currently 9.3 dBm, for example, which has a difference from the day zero value of 10.0 dBm (e.g., −0.7 dBm difference) that is below a threshold value (e.g., −0.5 dBm) for the intelligent optical transceiver 130.

Determining that this health parameter has dropped below a set threshold value detects that the signal strength of the transmitter is critically low, and may also indicate that the transmitter, or the intelligent optical transceiver 103 module as a whole, has degraded in a manner that may impact its proper function. In a scenario where the intelligent optical transceiver's 130 transmitter is simply allowed to fail, and the transceiver 130 cannot properly transmit data while the module is still installed and being employed by the networking device 120, there may be a loss of connectivity in the SAN which further leads to data unavailability. As previously described, reliability and accessibility are key metrics for the performance of storage networks, such as the SAN in FIG. 1. Failure of an optical component, at a larger scale where the storage network handles massive amounts of data, applications, and workloads can gravely impede speed, create bottlenecks, and lead to further inefficiencies.

To prevent these aforementioned drawbacks that could be caused by a failure of the intelligent optical transceiver 130, the intelligent time to fail predictor 132 can perform calculations to predict the "time to fail" using the health parameters that are determined by the module health monitor 131 before the failure occurs in operation. In an embodiment, the module health monitor 131 stores values corresponding to the health parameters periodically (e.g., a set time period, every hour, every day, etc.) in a manner that provides enough data to be extrapolated for the intelligent time to fail predictor 132 to predict the "time to fail." Alternatively, in another embodiment, the module health monitor 132 stores the value data for the health parameters only when a health parameter falls below the defined threshold value, in an effort to consume less memory/storage resources of the intelligent optical transceiver 130.

The intelligent time to fail predictor 132 obtains the stored historical data associated with values of the monitored health parameters and applies one or more defined functions to the data to execute calculations that ultimately derive a "time to fail." The defined functions can be any mathematical formula, equation, expression, that is capable of extrapolating historical data points in order to determine a relationship/trend that predicts one or more additional future data points. As will be described in detail, the intelligent time to fail predictor 132 can be configured to utilize a polynomial function, such as a polynomial regression function, as the defined function to extrapolate the most recently stored data points for a health parameter and regressively model a non-linear relationship between the data that trends to forecast and/or predict a future data point that is associated with a failure of that component and/or the intelligent optical transceiver 130. That is, the intelligent time to fail predictor 132 can use multiple known (or measured) values for a health parameter to analyze a trend in the data, where the trend/model can further be used to derive a prediction of an amount of time until that health parameter reaches a defined "fail" value. In the example of the TX output power, a defined "fail" value can be set to an operational minimum for a power value in dBm, such as 3.5 dBm or −7.5 dBm for a difference threshold. Consequently, if the real-time values that are measured from monitoring the transceiver's 130 transmitter reach the "fail" value, and optical signals are being generated at such a substantially low power level, it can be assumed that the optical transmitter is malfunctioning or non-operational which could negatively impact performance of the network. The intelligent time to fail predictor 132 predicts an amount of time in the future where the transceiver 130 could reach the defined "fail" value, before this occurs in operation in order to avoid such a catastrophic failure of the transceiver 130. The amount of time that is predicted and/or forecasted by the intelligent time to fail predictor 132 is considered the "time to fail" for the intelligent optical transceiver 130.

Referring back to the example, multiple stored values for the TX output power, including the previously measured 9.5 dBm, are analyzed by the intelligent time to fail predictor 132 by applying a polynomial function to the corresponding data. Modeling the data based on solving the defined polynomial function enables the intelligent time to fail predictor 132 to extend the model/trend in a manner that forecasts when the TX output power will reach a defined "fail" value and/or threshold value. For instance, a "fail" threshold value can be defined as −7.5 dBm from the initial TX output power value for the intelligent optical transceiver 130. In this example, the "time to fail" determined by the intelligent time to fail predictor 132 indicates a time (e.g., hours, days, total number of "power on" days) until the transmitter of the intelligent optical transceiver 130 will generate an optical signal power in a range that is so low, which is equal to or below the defined "fail" threshold from the day zero value (e.g., −7.5 dBm below the day zero value), that the component is considered to be malfunctioning and/or non-operational. In an embodiment, the predicted "time to fail" by the intelligent time to fail predictor 132 is an aspect of autonomous features of the storage network and/or the intelligent optical transceiver 130 that can self-learn, self-heal, and ensure optimal performance while dramatically reducing inefficiencies and performance risks. For instance, the intelligent optical transceiver 130 can use its built-in health parameter monitoring and "time to fail" prediction capabilities to autonomously perform a corrective action to resolve the issue, for example taking itself off-line (e.g., power off) prior to the predicted "time to file", in a manner that prevents connectivity loss and/or data unavailability and optimizes the network. Accordingly, the disclosed intelligent optical transceiver 130 enables critical capabilities that can support advancements in storage networking that can progress the industry towards making autonomous self-healing SAN technology a reality.

FIG. 2 depicts an example configuration of the intelligent optical transceiver 200 to implement the distinct health parameter monitoring and the "time to fail" prediction capabilities as disclosed herein. As previously described, the intelligent optical transceiver 200 can use the "time to fail" prediction in a manner that prevents the module from failing while still in use, and also avoids exacerbated issues that can result from the transceiver's 200 failure in a storage networking environment, such as data inaccessibility. Furthermore, the disclosed operation of the intelligent optical transceiver 200 can lead to other enhanced capabilities within a storage network, such as advanced self-learning, self-optimizing, and self-healing capabilities that can vastly improve the overall reliability and resiliency of the storage networking environment.

As depicted in FIG. 2, the internal components of the intelligent optical transceiver 200 can include: a Field Programmable Gate Array (FPGA) 210 implementing the intelligent time to fail predictor 220 with the polynomial function 221, and the module health monitor 230; an Electrically Erasable Programmable Read-Only Memory (EEPROM) 240; optical components 250, implementing the optical transmitter and the optical receiver; and an electrical connector 260. Generally, the intelligent optical transceiver 200 converts electrical signals from a device, such as an FC switch (shown in FIG. 1) to an optical signal that can be transmitted and/or received over fiber optic cable.

At one end of the module's configuration is an electrical connector 260 that provides an electrical interface to a port of a device in which the transceiver 200 is installed, such as an FC switch (shown in FIG. 1). At the opposing end of the intelligent optical transceiver 200 are the optical components 250, namely an optical transmitter and optical receiver. The optical components 250 of the intelligent optical transceiver 200 can include several components that perform the transceiver's 200 optical-based capabilities, such as generating and/or detecting optical signals. As previously described the optical components 250 include the optical transmitter and optical receiver, and thus this section of the transceiver 200 houses the components that enable data transmission and reception over fiber optic cable. For example, the optical components 250 can comprise a transmitter optical subassembly (TOSA) at the transmit side, which includes a laser diode and an optical interface bus. The receiver side of the optical components 250 can comprise a receiver optical sub-assembly (ROSA), which includes a photodiode, a trans-impedance amplifier (TIA), and an electrical interface. The optical components 250 may include additional components that enable its functions, such as a read-only memory (ROM) or other memory element (used to store information such as clock data in the electrical input signal), an IC chip, a multiplexer/demultiplexer (MUX/DEMUX), drivers, etc.

The electrical connector 260 can be connected to a printed circuit board (PCB) that includes the FPGA 210. The FPGA 210 is implemented as an array of integrated circuit (IC) chips that are configured to operate similar to a processor, a microcontroller, and controls all of the transceiver's 200 functions, including the health monitoring and "time to fail" prediction functions of the intelligent optical transceiver 200. Accordingly, the FPGA 210 is shown to include the module health monitor 230 and the intelligent time to fail predictor 220 hardware. In an example embodiment, the module health monitor 230 and the intelligent time to fail predictor 220 are each implemented as a dedicated IC chip of the FPGA 210 that is individually programmed to execute the component's respective function.

The module health monitor 230 is configured to monitor various health parameters of the intelligent optical transceiver 200 as a diagnostic tool that can be indicative of the overall operational "health" of the transceiver 200. The module health monitor 230 is configured to enable real-time access to a plurality of operational values of the transceiver's 200 various health parameters. For example, the module health monitor 230 can obtain real-time values of optical signal power that are measured at the optical components 250 (e.g., optical transmitter and optical receiver) of the transceiver 200, during operation. The module health monitor 230 can receive various forms of values that are related to the module's health parameters, including but not limited to: input/output power, bias current, temperature, supply voltage, and the like. Additionally, the module health module 230 can provide a system of alarm and warning flags which alert a host system when particular health parameters are monitored to be operating outside of a factory set normal operating range and/or below a defined threshold value (from the initial operating value).

In an embodiment, the module health monitor 230 can control sensors, calibrators, photodetectors, and other elements within the intelligent optical transceiver 200 that obtain readings and/or measurements from components that drive the core operation of the transceiver 200, such as the optical components 250. In other words, the values for the health parameters that are generated by the module health monitor 230 as diagnostics data, can be considered a digitization of internal analog signals. For example, the module health monitor 230 obtains various measurements (e.g., power, current, voltage) from the optical transmitter (TX), namely the TX output power, and measurements from the optical receiver (RX), namely the RX input power, as health parameters that are stored and further analyzed by the system. The module health monitor 230 can also store the defined threshold values, the initial values (e.g., day zero value), and the "fail" values for the transceiver's 200 health parameters, which are further used to evaluate the values with respect to determining when the values (corresponding to a monitored health parameter) are stored in the EEPROM 240, when the values trigger an alarm flag, predict the "time to fail," and other determinations/calculations of the intelligent optical transceiver 200. The module health monitor 230 can have a serial interface to the EEPROM 240, which enables communication between the elements to transfer and store elements. Also, the module health monitor 230 may utilize a memory mapping of the EEPROM 240 so that values corresponding to certain health parameters are stored in certain bits/bytes (or addresses) of the EEPROM 240.

The threshold values can be defined as numerical values, quantities, limits/boundaries, and measurable factors that are related to the health parameters. The threshold values can include a set value (representing a unit of measurement corresponding to the monitored component/health parameter), an amount of time, and a difference value (representing the difference between a current real-time value and an initial value/previous value of the monitored component/health parameter). An example of threshold values corresponding to TX output power, for example, can include [−0.5 (difference), +1 (difference)]. In this example, a current reading for TX output power of 9.2 dBm, with an initial value for TX output power of 9.4 dBm at day zero (having a difference of −0.2 dBm) would not be considered below the threshold, and not saved in the EEPROM.

Another example of threshold value corresponding to TX output power can include [−0.5 (difference)], +1 (difference)]. In this example, a current reading for TX output power of 8.9 dBm, with an initial value for TX output power of 9.4 dBm at day zero (having a difference of −0.5 dBm) would be considered below the threshold and saved in the EEPROM. The module health monitor 230 can also utilize a series of threshold values for a health parameter that is intended to capture a window of operational values, for instance, having values that represent the health parameter's performance as the component progressively degrades over time. An example of such a series of multiple thresholds windows includes, [−0.5 (difference), −1 (difference)], [−1 (difference), −1.5 (difference)], [−1.5 (difference), −2 (difference)], [−2 (difference), −3 (difference)], [−3 (difference), −inf (difference)]. In this example, the EEPROM would store several historical values for the TX output power at increasing levels of degradation, as the real-time optical signal power from the transmitters falls lower from the transmitter's day zero value at deployment. The manner in which the threshold values are defined can be a critical design point with respect to the operation of the module health monitor 230, and ultimately the "time to fail" prediction capabilities of the intelligent optical transceiver 200. For instance, threshold values defined with strict boundaries may cause monitored health values to be stored more frequently, and "time to fail" predictions to be calculated/updated more frequently which improves accuracy of the predictions, but this may have the design tradeoff of more overhead and latency with memory/computational resources of the transceiver 200. In another embodiment, the module health monitor 230 stores values corresponding to the health parameters periodically (e.g., a set time period, every hour, every day, etc.) in a manner that relies only partially or eliminates the use of the defined thresholds.

The intelligent time to fail predictor 220 is configured to further analyze the stored values corresponding to the health parameters monitored by the module health monitor 230, in order to derive the "time to fail" prediction for the intelligent optical transceiver 200. As referred to herein, the "time to fail" can be considered as a maintenance metric that indicates the amount of time that a part, component, or system can run before it experiences a failure that leads to severe malfunction and/or inoperability. In some cases, the predicted "time to fail" can be considered the remaining lifespan on the intelligent optical transceiver 230 and/or its components, such as the optical components 250. The intelligent time to fail predictor 220, which is implemented on the FPGA 210 in the example of FIG. 2, can be communicatively connected to the EEPROM 240 to retrieve and/or transfer the data, or stored values for health parameters, from storage as necessary. The analysis performed by the intelligent time to fail predictor 220 can include applying one or more defined mathematical functions to the diagnostic data relating to the monitored health parameters, or stored values, which ultimately calculates a predicted "time to fail". According to an embodiment, the intelligent time to fail predictor 220 is configured to use a polynomial function, such as a polynomial regression function, as the defined function. Thus, FIG. 2 illustrates the intelligent time to fail predictor 220 hardware as being programmed with logic to execute a defined polynomial function 221. The polynomial function 221 and related functionality can be implemented as logic, firmware, software, instructions, or the like, on the intelligent time to fail predictor 220. As an example, the polynomial function 221 can be defined as a quadratic/regression, or the mathematical equation:

$$ax^2+bx+c=\text{known fail value} \quad (1)$$

where x is time to fail, and where known fail value is a known value associated with failure of optical transceiver component The coefficients a, b, c for equation (1) can be solved using at least three data points from the stored historical values of the health parameter. For example, three data points could be defined as $(x_1, y_1)$, $(x_2, y_2)$, and $(x_3, y_3)$, where x is a time corresponding to the value, indicating when in the transceiver's 200 operational history that the monitored health parameter, or component, was operating at said value; and where y is the stored value. The known fail value can be predefined for a health parameter and stored in EEPROM 240 before deployment. Referring back to the TX output power example, x can be a time based on a number of "power on" days for the transceiver 200 when the corresponding value was read from TX, and y is the stored value (digital) for the TX output power. For example, the historical values used to solve the polynomial are the three most recently stored values, or the values having the most recent/largest corresponding x time parameter (e.g., most number of "power on" days). After the data points from the historical stored data for the health parameter are selected, the coefficients a, b, c for equation (1) can be solved from calculations, such as reverse quadratic calculations, using the mathematical equations:

$$a = \frac{x_3(-y_1 + y_2) + x_2(y_1 - y_3) + x_1(-y_2 + y_3)}{(x_1 - x_2) + (x_1 - x_3) + (x_2 - x_3)} \quad (2)$$

$$b = \frac{x_3^2(y_1 - y_2) + x_1^2(y_2 - y_3) + x_2^2(-y_1 + y_3)}{(x_1 - x_2) + (x_1 - x_3) + (x_2 - x_3)} \quad (3)$$

$$c = \frac{x_3(x_2(x_2 - x_3)y_1 + x_1(-x_1 + x_3)y_2) + x_1(x_1 + x_2)y_2 y_3}{(x_1 - x_2) + (x_1 - x_3) + (x_2 - x_3)} \quad (4)$$

The values for the coefficients a, b, c that are derived from equations (2), (3), and (4) can be used in the previous equation (1) with the known fail value, in order to solve for x which is the predicted "time to fail" value for the intelligent optical transceiver 200. Thus, by utilizing the defined polynomial function 221 to analyze multiple historical data points for the health parameter and derive a regression model (e.g., graphical curve), where the historical data points represent a group of operational values and times collected as the component is degrading, the intelligent time to fail predictor 220 can extrapolate the regression model in manner that predicts a data point in the future. This predicted future data point, or extrapolated data point, has a corresponding time value (e.g., how many more days, total "power on" days), or x value, which represents an amount of time until the monitored component reaches the known fail value. It is this time value, or x value, which corresponds to the known fail value, and is calculated from equation (1), that serves as the "time to fail" prediction for the intelligent optical transceiver 200.

In addition, another approach using a different group of mathematical equations can be used to solve the coefficients a, b, c for equation (1). In this approach, the historical data points for the health parameter are shifted by setting one data point at an origin (with respect to a cartesian coordinate system). For example, when using three data points in this approach, the historical data points can be defined as (0, 0), $(x_2-x_1, y_2-y_1)$, and $(x_3-x_1, y_3-y_1)$, which sets coefficient c to a zero value (i.e., c=0) and reduces the complexity of the calculations to solve for the remaining coefficients a, b. Accordingly, the coefficients a, b, c for equation (1) can be solved using the mathematical equations:

$$a = \frac{x_3 \cdot y_2 - x_2 \cdot y_3}{x_2 \cdot x_3(x_2 - x_3)} \quad (5)$$

$$b = \frac{-x_3^2 \cdot y_2 + x_2^2 \cdot y_3}{x_2 \cdot x_3(x_2 - x_3)} \quad (6)$$

$$c = 0 \quad (7)$$

The values for the coefficients a, b, c that are derived from equations (5), (6), and (7) can be used in the previous equation (1) with the known fail value, in order to solve for x. In this approach, and an additional equation is used to calculate the predicted "time to fail" value for the intelligent optical transceiver 200, using the value derived for the x. The "time to fail" value is derived in this approach from the x value solved from equation (8), and can be calculated with the mathematical equation:

$$\text{time to fail} = x - (x_3 - x_1) \quad (8)$$

All of the aforementioned equations (1)-(8) can be stored as part of the logic for the polynomials function 221 that is programmed in the intelligent time to fail predictor 220. It should be understood that the equations are not intended to be limiting, and other forms of mathematical equations, algorithms, models, functions, and calculations that are suitable for prediction and/or forecasting can be employed in addition to (or in lieu of) the polynomial, quadratic, and regression functions described above. In an embodiment, the predicted "time to fail" values generated by the intelligent time to fail predictor 220 are saved at defined registers of the EEPROM 240. Furthermore, as previously described, the "time to fail" values predicted by the intelligent time to fail predictor 220 can be used to trigger a corrective action, such as an alert that notifies a network administrator or an autonomous self-healing action, that addresses the issue before the intelligent optical transceiver 200 reaches the point of an operational failure. The intelligent time to fail predictor 220 is configured to automatically perform one or more corrective actions prior to the predicted "time to fail", including transmitting an alert; executing an autonomous self-healing action (e.g., automatically increase/decrease the voltage/power to components); and executing a power off (e.g., shut off voltage/power to the optical transceiver 200). Consequently, the dynamic health monitoring and health analytics functions of the intelligent optical transceiver 200, as described herein, may eliminate disruptions that leads to optimizing the overall performance and reliability of a network, such as a SAN.

Figure 3:
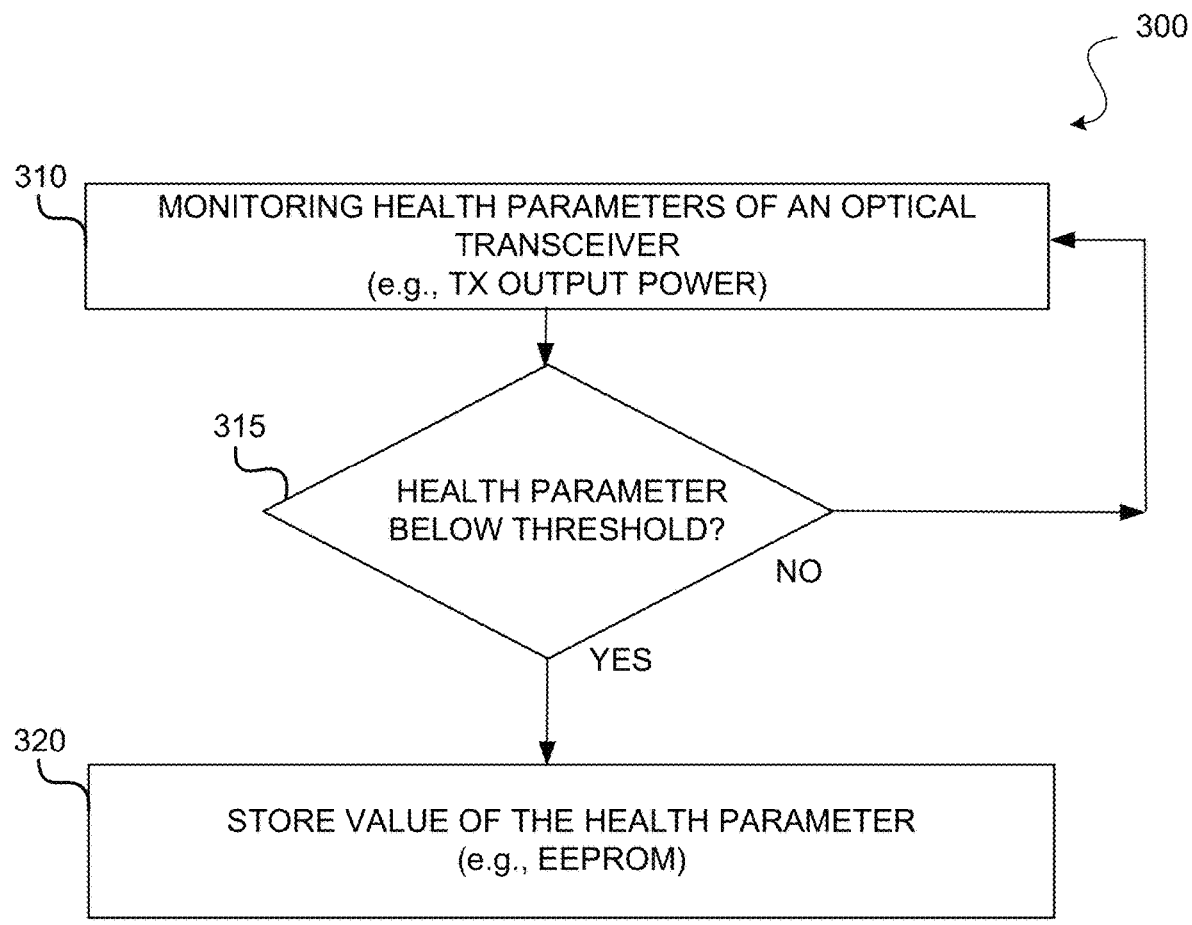
FIG. 3 is an operational flow diagram illustrating an example method for implementing the health parameter monitoring aspects of the intelligent optical transceiver shown in FIG. 2, in accordance with the disclosure.

FIG. 3 is an operational flow diagram illustrating an example method 300 for implementing the dynamic health monitoring capabilities of the intelligent optical transceiver. The process 300 can begin at operation 310 with monitoring one or more health parameters of the optical transceiver. As described herein, the monitoring of operation 310 is dynamic and performed in real-time as a diagnostic tool to assess the operational health of the intelligent optical transceiver. For example, operation 310 can involve receiving telemetry, instrument readings, operational data, and measured operational values (e.g., from sensors) of the transceiver's various components while it is actively used in optical communications (e.g., being employed by an FC switch). Health parameters that are monitored can be associated with components that are critical to function of the intelligent optical transmitter, such as the optical transmitter (TX), the optical receiver (RX), and other optical components. Examples of types of health parameters for components that are monitored can include, but are not limited to: output power, receive power, bias current, temperature, supply voltage, etc. As described herein, the TX output power is a health parameter that is monitored for the intelligent optical transceiver. In an embodiment, the values for the health parameters that are monitored are converted from analog values, obtained by the sensors measuring operation values at the components, to digital values that can be stored and further analyzed.

Next, at operation 315, the health parameter values are analyzed to determine whether health parameter is below a corresponding threshold value. In an embodiment, the value data for the health parameters is stored only when a health parameter falls below the defined threshold value, in order to consume less memory/storage resources of the intelligent optical transceiver. The defined threshold can be set as minimum values for the health parameter and/or amounts of difference from the initial value for the health parameter. Thus, operation 315 can involve comparing a current value for the monitored health parameter to the defined threshold to determine whether the current value is below one of the set minimum values for the parameter, or whether the current value has a difference from the initial value that is greater than one of the set differences.

For example, an initial TX output power for the intelligent optical transceiver can be approximately 10.0 dBm and the threshold value is set as a difference value of −0.5 dBm from this initial TX output power. From dynamcally monitoring this health parameter in previous operation 310, sensors can read that the TX output power is now currently 9.3 dBm. Then, operation 315 can involve comparing the current value for the TX output power (e.g., 9.3 dBm) to the initial value for this health parameter (e.g., 10.0 dBm), where the resulting difference between these values is compared to the defined threshold value. In determining that the current value for TX output power (9.3 dBm) and the initial TX output power (10.0 dBm) have a difference (e.g., −0.7 dBm) that is below the defined threshold value (e.g., −0.5 dBm), it is determined that this current value for the health parameter should be stored. In the scenario where the current value for the monitored health parameter is below the defined threshold value (shown in FIG. 3 as "yes") this can indicate that the health of the intelligent optical transceiver may be degrading in a manner that can negatively impact its proper function, and the process 300 proceeds to operation 320.

Subsequently, at operation 320, the current value for the health parameter is stored in order to be further analyzed to evaluate the health of the intelligent optical transceiver. The value for the health parameter can be stored in a dedicated memory element of the intelligent optical transceiver, such as an EEPROM. To perform the storing of operation 320, a memory mapping of the EEPROM may be utilized so that values corresponding to certain health parameters are stored in defined bits/bytes (or addresses) of the EEPROM. Additionally, values for the health parameters can be stored in a format of data points defined as $(x_1, y_1)$, where x is a time (e.g., "power on" days) corresponding to the value, indicating when in the transceiver's operational history that the monitored health parameter was operating at said value, and where y is the stored value.

Values for health parameters can be stored in a memory element of other transceiver components, for instance storing values in a memory of the module health monitor or FPGA, in addition to or in lieu of the EEPROM. Thereafter, stored values can be analyzed in order to evaluate the health of the intelligent optical transceiver. Particularly, the values for health parameters that are stored in operation 320 can be utilized in the method of FIG. 5 for implementing the "time to fail" prediction aspects. In other words, the "time to fail" prediction calculations are performed on the stored health parameter values to derive a "time to fail" prediction that can ultimately thwart a catastrophic failure of the intelligent optical transceiver and further prevent negative impacts to the larger networking system. Moreover, process 300 can be iterative, where after the value for a health parameter is stored in operation 320, the process 300 can return back to operation 310 to continue to monitor the one or more health parameters for the intelligent optical transceiver in real-time.

Referring back to operation 315, in the case when the current value corresponding to the health parameter is not below the defined threshold value (shown in FIG. 3 as "no"), then the process 300 returns to operation 310 to continue dynamically monitoring the health of the intelligent optical transceiver without storing the current value of the health parameter. As a result, the process 300 can iteratively execute operations 310-320, which continues to monitor operational values in real-time for the transceiver's various health parameters and determines whether current values indicate a degradation of the transceiver's operational health (e.g., below the threshold value) in a manner that requires the data to be stored for further analysis.

Figure 4:
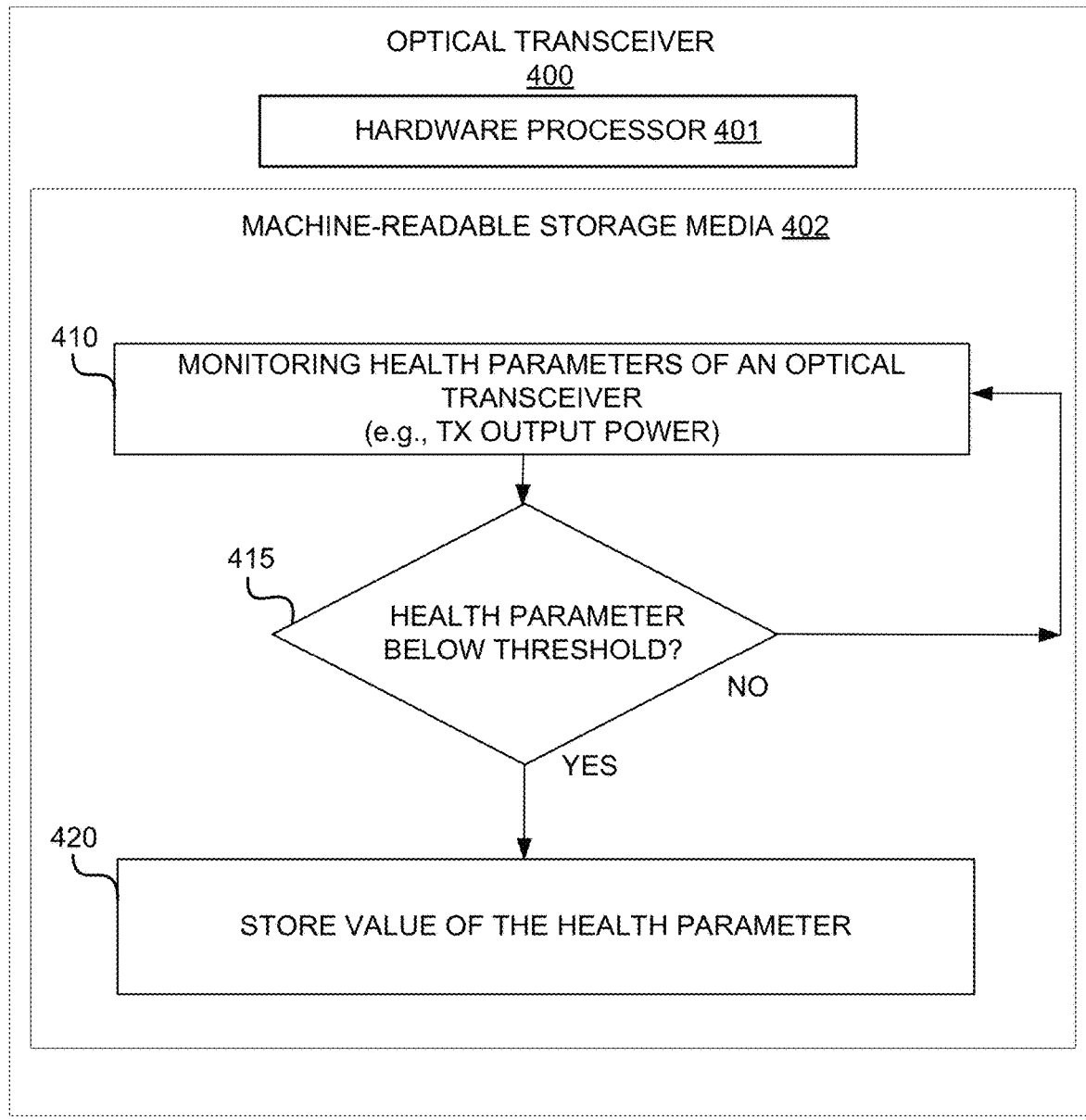
FIG. 4 depicts a block diagram of a computer system for implementing the method illustrated in FIG. 3, in accordance with the disclosure.

FIG. 4 depicts an example computer system 400 that can perform a series of executable operations for implementing the health parameter monitoring functions, as disclosed herein. The computer system 400 can be an optical component, networking device, or system that is capable of supporting optical communication technology, such as the disclosed intelligent optical transceiver (shown in FIG. 2). Particularly, the computer system 400 is depicted in FIG. 4 as the intelligent optical transceiver. FIG. 4 also depicts a process, similar to the process described above in reference to FIG. 3, that is stored as a series of executable operations in a machine-readable storage media 402 that are performed by a hardware processor 401.

The processor 401 may fetch, decode, and execute the machine-readable instructions 410 to monitor health parameters of the intelligent optical transceiver in real-time. For example, an example of a health parameter that is monitored is the TX output power, which is an operational value associated with the optical transmitter elements of the transceiver.

The processor 401 may fetch, decode, and execute the machine-readable instructions 415 to determine whether a health parameter of the intelligent optical transceiver is below a defined threshold value. The determination can involve comparing the current value for the health parameter, that is obtained as a result of monitoring in the previous instruction 410, to a defined threshold value that corresponds to the health parameter.

The processor 401 may fetch, decode, and execute the machine-readable instructions 415 to store the current value for the heath parameter. The current value for the health parameter is stored in response to determining that the current value for the health parameter is below the defined threshold value for the health parameter. In an embodiment, values for health parameters are stored in an EEPROM of the intelligent optical transceiver.

Figure 5:
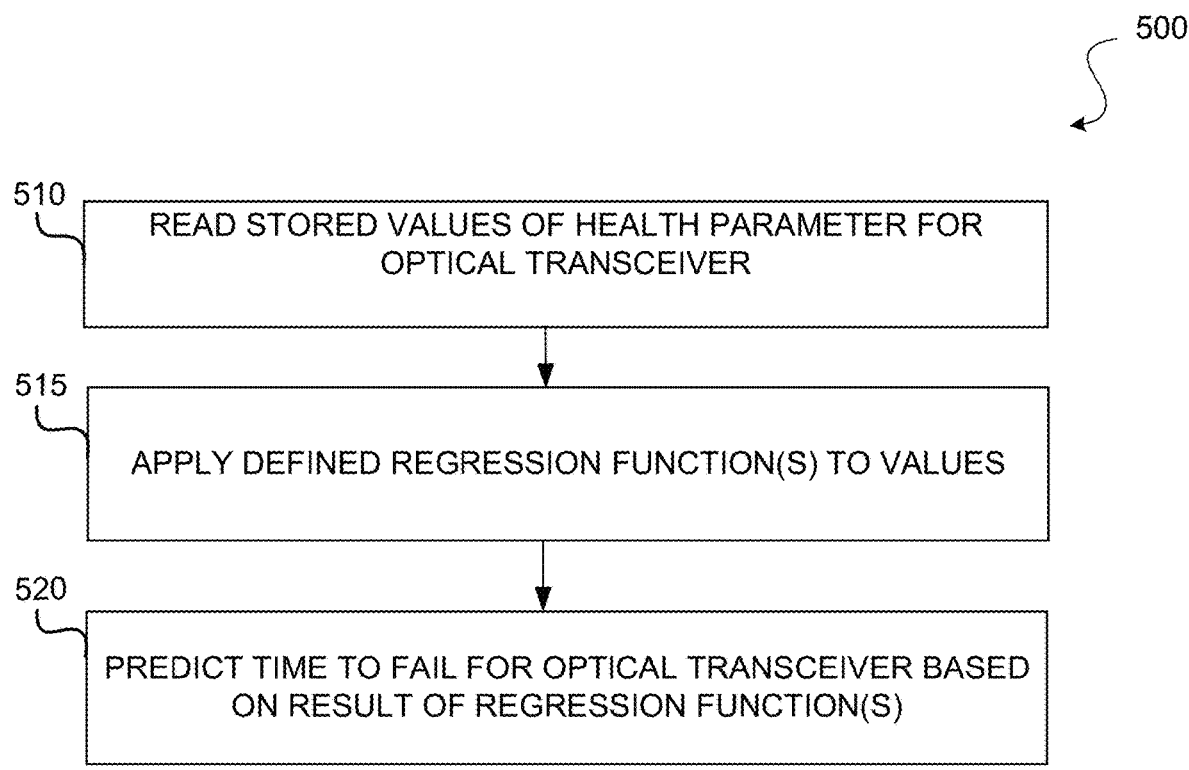
FIG. 5 is an operation flow diagram illustrating an example method for implementing the "time to fail" prediction aspects of the intelligent optical transceiver shown in FIG. 2, in accordance with the disclosure.

FIG. 5 is an operational flow diagram illustrating an example method 500 for implementing the "time to fail" prediction capabilities of the intelligent optical transceiver. The process 500 can begin at operation 510 with reading one or more previously stored values for a health parameter of the optical transceiver. Thus, the process 500 can perform analysis on the stored values, which serves as historical data for the transceiver's various health parameters. This historical data can be indicative of how the intelligent optical transceiver may be degrading over time while in use, thereby making the historical data contextually and/or quantitatively useful in a "time to fail" prediction performed by the process 500. As described in detail above, for example in reference to FIG. 3, values for a health parameter can be stored in a dedicated memory element of the intelligent optical transceiver, such as an EEPROM. Accordingly, operation 500 can involve accessing defined bytes (or addresses) of the EEPROM that correspond to a certain health parameter, in order to retrieve the stored values. Furthermore, in some cases, operation 510 retrieves the most recent historical data for the health parameter, which can be the stored values having the most recent/largest corresponding time parameter (e.g., the greatest number of "power on" days). Values for a health parameter can be stored in a format of data points defined as $(x_1, y_1)$, and reading the stored values for a health parameter can involve obtaining three, for example, of the most recent historical data points for a health parameter.

Next, at operation 515, one or more defined regression functions are applied to the obtained stored values, or historical data, of the monitored health parameters. Thus, operation 515 involves executing calculations using the historical data to derive a "time to fail" prediction. The defined regression functions can be mathematical formulas, equations, expressions, that are capable of extrapolating historical data points in order to determine a relationship/trend that predicts one or more additional future data points. According to an embodiment, the defined regression function is a polynomial function represented by equation (1). By applying the polynomial function to the historical data points, the data points are extrapolated in order to regressively model the data in a manner that forecasts and/or predicts a future data point that is associated with a failure of that component and/or the intelligent optical transceiver. The predicted future data point, or extrapolated data point, has a corresponding time value, or x value with respect to the $(x_1, y_1)$, data point, which represents an amount of time until the monitored component reaches the known fail value. It is this time value, or x value, which corresponds to the known fail value, and is calculated from applying the defined regression function, for example the result of solving for x in the polynomial function of equation (1), that serves as the "time to fail" prediction for the intelligent optical transceiver.

In addition, operation 515 can involve performing multiple calculations using functions that are related to the defined regression function(s). For example, operation 515 can include applying equations (2)-(8) which may be utilized to derive variables within the defined polynomial function and/or to calculate the "time to fail" from the result of the polynomial function.

Thus, at operation 520, the result(s) from calculations performed in previous operation 515, are used at the predicted "time to fail" for the intelligent optical transceiver. For example, a result of solving for x in the polynomial function of equation (1) can return a value that indicates a total number of "power on" days predicted for the life for the transceiver. In this case, operation 520 can involve determining the current number of "power on" days for the transceiver and sets a difference between the current number of "power on" days and the total number of "power on" days as the "time to fail" or the number of "power on" days remaining in the operational life of the intelligent optical transceiver.

Figure 6:
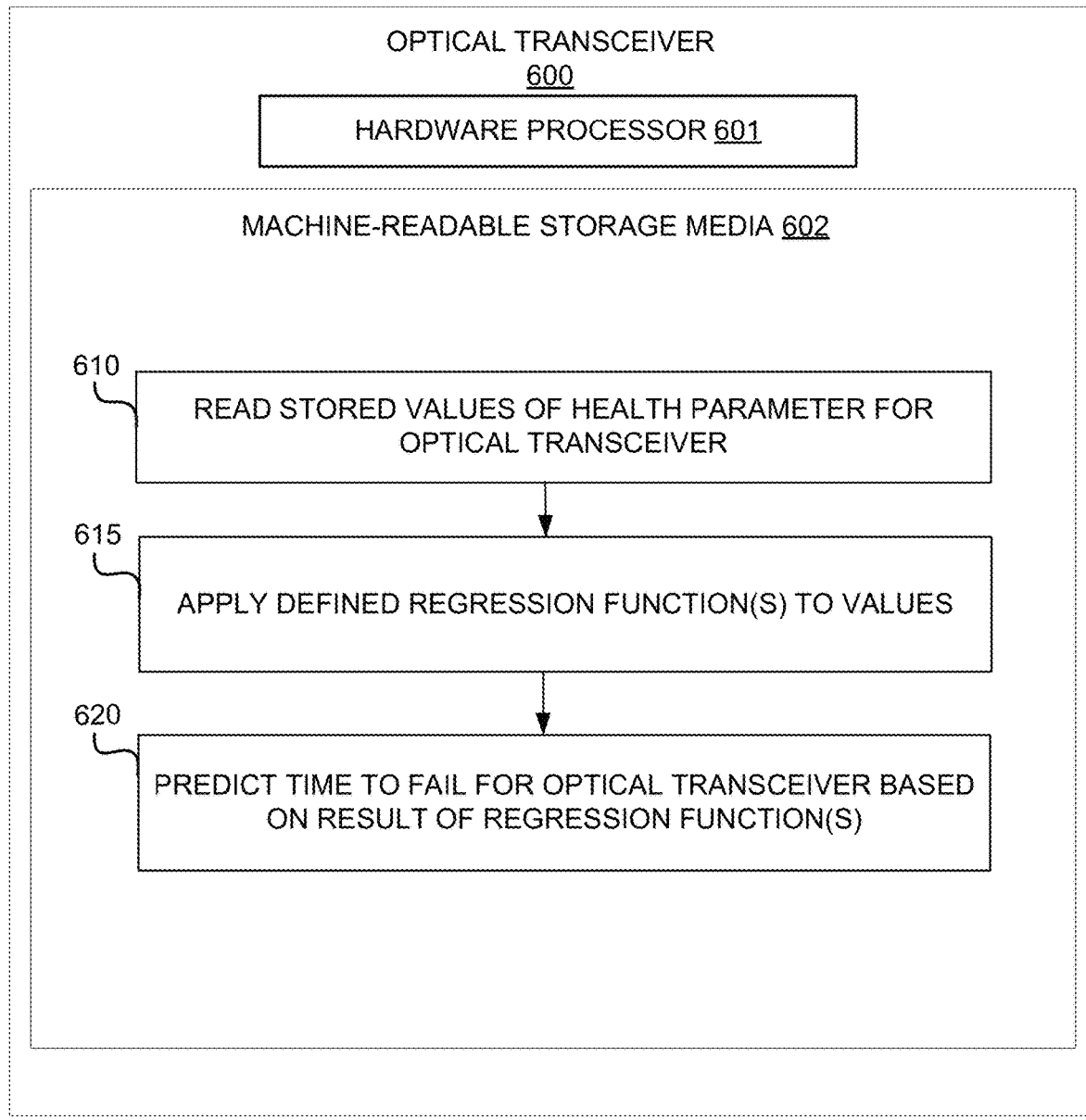
FIG. 6 depicts a block diagram of a computer system for implementing the method illustrated in FIG. 5, in accordance with the disclosure.

FIG. 6 depicts an example computer system 600 that can perform a series of executable operations for implementing the health parameter monitoring functions, as disclosed herein. The computer system 600 can be an optical component, networking device, or system that is capable of supporting optical communication technology, such as the disclosed intelligent optical transceiver (shown in FIG. 2). Particularly, the computer system 600 is depicted in FIG. 6 as the intelligent optical transceiver. FIG. 6 also depicts a process, similar to the process described above in reference to FIG. 5, that is stored as a series of executable operations in a machine-readable storage media 602 that are performed by a hardware processor 601.

The processor 601 may fetch, decode, and execute the machine-readable instructions 610 to read stored values of health parameters for the intelligent optical transceiver. The stored values corresponding to a health parameter can be read from a memory element on the intelligent optical transceiver, such as EEPROM. As previously described, stored values can be stored formatted as data points. Thus, a series of historical data points corresponding to a particular health parameter provides contextually rich and quantifiable data indicating the operational health of the component (e.g., measured/monitored in real-time) over a period of time can be stored.

The processor 601 may fetch, decode, and execute the machine-readable instructions 615 to apply defined regression function(s) to the values for a health parameter, where the values have been retrieved from storage. The defined regression function can be a polynomial function, regression function, quadratic function, and the like that is suitable for extrapolating historical data points for a health parameter in order to determine a relationship/trend that predicts a future data point that is associated with a known "fail" value for that health parameter. Accordingly, calculations are performed using the values that are read from storage and the defined regression function(s), where the derived result is a prediction of a time in the future when the component will reach its "fail" value. This predicted time serves as a "time to fail" prediction for the intelligent optical transceiver, in accordance with the embodiments.

The processor 601 may fetch, decode, and execute the machine-readable instructions 620 to predict the "time to fail" for the intelligent optical transceiver based on the result of the regression function(s). The time to fail prediction can be determined based on a unit of time, such as total "power on" days, remaining days, remaining hours, and the like. Consequently, by having an awareness of the remaining operational life, or "time to fail," of the intelligent optical transceiver, corrective actions to resolve the issue, for example autonomously taking itself off-line, autonomously alerting a network administrator, can be performed before the transceiver reaches the point of malfunctioning and/or being non-operational.

Therefore, by leveraging health monitoring and "time to fail" prediction capabilities, the disclosed intelligent optical transceiver may achieve diagnostic, operational health analysis, and automation (e.g., automated health monitoring, "time to fail" predictions, and corrective actions) to save time and mitigate disruptions within the storage network, such as failures that cause data unavailability in the field.

Figure 7:
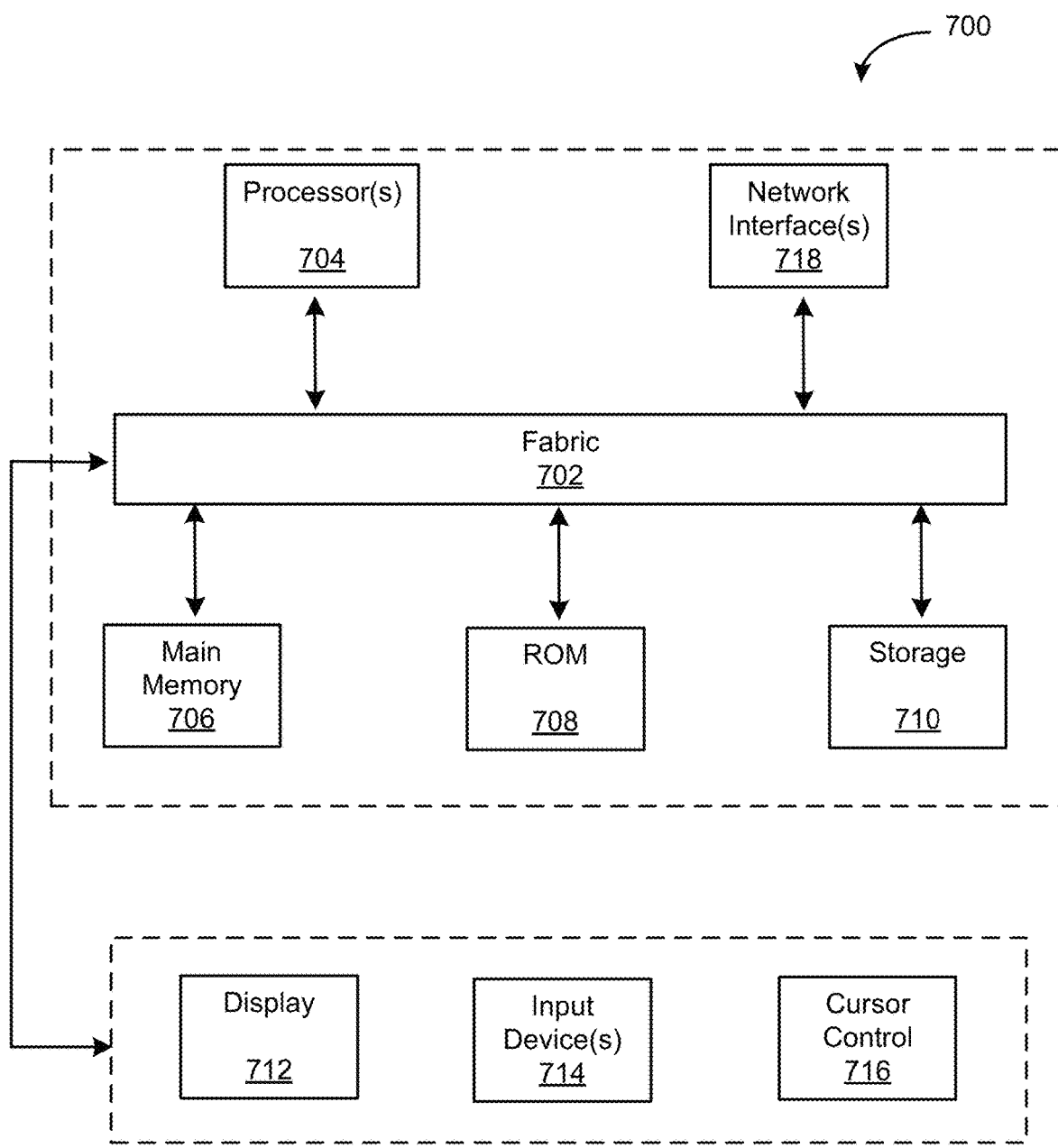
FIG. 7 depicts a block diagram of an example computer system in which various implementations described herein may be implemented.

FIG. 7 depicts a block diagram of an example computer system 700 in which the optical transceiver having health parameter monitoring and "time to fail" prediction capabilities described herein may be utilized. For example, the computer system 700 may be a networking device, such as an FC switch (shown in FIG. 1) including the intelligent optical transceiver, as described in detail above. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes storage devices 710 such as a read only memory (ROM) or other static storage device coupled to fabric 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 516, such as a mouse, a trackball, or cursor direction keys for communicating direction information and command selections to processor 704 and for controlling cursor movement on display 712. In some implementations, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative implementations, hard-wired circuitry may be used in place of or in combination with software instructions.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain implementations include, while other implementations do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   reading values associated with a health parameter of an optical component of an optical transceiver, wherein each of the values are stored in a memory element of the optical transceiver;
   extrapolating the values of the health parameter to predict a future data point of the health parameter; and
   computing an amount of time to fail for the optical component based on the predicted future data point of the health parameter, wherein the computed amount of time is an amount of time for the health parameter to reach the predicted future data point.

2. The method of claim 1, further comprising one or more defined regression functions to the values of the health parameter, wherein the one or more defined regression functions comprise a polynomial function.

3. The method of claim 2, wherein applying the polynomial function to the values of the health parameter extrapolates historical data points of the health parameter to predict the future data point of the health parameter.

4. The method of claim 3, wherein the future data point is associated with a known fail value corresponding to the parameter.

5. The method of claim 3, wherein a time parameter associated with the predicted future data point corresponds to a predicted time to fail for the optical transceiver.

6. The method of claim 5, wherein the predicted time to fail indicates a number of days remaining before the health parameter drops below a known fail value or a total number of power on days before the parameter drops below a known fail value.

7. The method of claim 1, wherein the values associated with the health parameter correspond to a current output power of an optical transmitter of the optical transceiver.

8. An optical transceiver, comprising:
   an optical communication component;
   one or more processors; and
   memory having stored thereon instructions that, when executed by the one or more processors cause the optical transceiver to:
   monitor, in real-time, health parameters associated with the optical communication component;
   determine whether at least one of the monitored health parameters are below a corresponding threshold value;
   in response to determining that the monitored health parameter is below a corresponding threshold value, store one or more values associated with the monitored health parameter in the memory;
   read one or more values associated with the monitored health parameter, wherein each of the values are stored in the memory of the optical transceiver;
   apply extrapolate the values of the health parameter to predict a future data point of the health parameter; and
   compute an amount of time to fail for the optical communication component based on the predicted future data point of the health parameter, wherein the computed amount of time is an amount of time for the health parameter to reach the predicted future data point.

9. The optical transceiver of claim 8, wherein the time to fail predictor having stored thereon instructions that, when executed by the processor, further cause the processor to:
   automatically perform one or more corrective actions prior to the computed amount of time to fail.

10. The optical transceiver of claim 9, wherein the one or more corrective actions comprise: transmit an alert, execute an autonomous self-healing action, and execute a power off.

11. The optical transceiver of claim 8, wherein the optical communication components comprise a transmitter optical subassembly (TOSA) and a receiver optical sub-assembly (ROSA).

12. The optical transceiver of claim 11, wherein the monitored health parameters comprise an output power of the TOSA and an input power of the ROSA.

13. The optical transceiver of claim 8, wherein the processor comprises a Field Programmable Gate Array (FPGA).

* * * * *